United States Patent [19]

Davis et al.

[11] 4,292,190

[45] Sep. 29, 1981

[54] CORROSION INHIBITED AQUEOUS COMPOSITIONS CONTAINING TERTIARY, BICYCLIC, OR TRICYCLIC AMINES

[75] Inventors: Pauls Davis, Gibraltar; Jerrold F. Maxwell; Joe C. Wilson, both of Woodhaven, all of Mich.

[73] Assignee: BASF Wyandotte Corporation, Wyandotte, Mich.

[21] Appl. No.: 142,482

[22] Filed: Apr. 21, 1980

Related U.S. Application Data

[63] Continuation-in-part of Ser. No. 89,620, Oct. 29, 1979, abandoned.

[51] Int. Cl.$^3$ .......................... C11D 7/32; C09K 5/00
[52] U.S. Cl. ........................................ 252/75; 252/73; 252/77; 252/150; 252/148; 252/146; 252/156; 252/390; 252/394; 252/158; 106/14.15; 106/14.16; 106/14.42; 422/12; 422/17
[58] Field of Search ..................... 252/77, 73, 75, 156, 252/158, 146, 148, 150, 390, 394; 106/14.15, 14.16, 14.42; 422/12, 17

[56] References Cited

U.S. PATENT DOCUMENTS 2,939,881  6/1960  Orchin ................................. 260/2.5
3,981,780  9/1976  Scherrer et al. .................. 422/12 X

*Primary Examiner*—Mayer Weinblatt
*Attorney, Agent, or Firm*—Andrew E. Pierce

[57] ABSTRACT

Tertiary, cyclic, bridgehead amines are disclosed as useful corrosion inhibitors for metals in contact with aqueous alkaline liquids. The disclosed amines have been found to be strongly resistant to thermal decomposition, to chemical attack, and to nitrosation. The use of these corrosion inhibitors is particularly desirable in aqueous alcohol compositions useful as a heat exchange liquid in the cooling systems of an internal combustion engine wherein said aqueous solutions are ethylene glycol-based compositions. The disclosed amines are useful under alkaline conditions alone or in combination with conventional corrosion inhibitors such as water-soluble metal salts of tolyltriazole and phosphoric acid, alkali metal nitrites and nitrates, and alkali metal phosphates.

16 Claims, No Drawings

CORROSION INHIBITED AQUEOUS COMPOSITIONS CONTAINING TERTIARY, BICYCLIC, OR TRICYCLIC AMINES

CROSS REFERENCE TO RELATED APPLICATIONS

This is a continuation-in-part of copending application Ser. No. 89,620, filed Oct. 29, 1979, now abandoned.

BACKGROUND OF THE INVENTION

1. Field of the Invention

The invention relates to a corrosion inhibited aqueous solution, particularly an antifreeze composition useful as a coolant in a heat-exchange system such as the cooling system of an internal combustion engine.

2. Prior Art

Anitfreeze concentrate compositions adapted to be diluted with water and used as coolants for internal combustion engines generally contain a major amount of a watersoluble alcohol, a buffer capable of maintaining the pH of the diluted concentrate between a pH of about 7.5 to about 11, about 0.5 to 5 percent by weight of additives to inhibit corrosion and foaming during use, and the balance water. The alcohol can be methanol, ethylene glycol, diethylene glycol, glycerol, etc. The additives, besides metal corrosion inhibitors and antifoam agents, can include a water-pump lubricant. As a consequence of the wide variety of metals utilized in contact with the cooling system compositions in an internal combustion engine, a wide variety of inhibitors have been proposed for use in cooling system compositions containing an alcohol. This is because no one inhibitor has yet provided protection for all of the various metals in contact with the cooling system liquid.

Examples of prior art corrosion inhibitors include inorganic compounds such as alkali metal phosphates, borates, molybdates, arsenates, arsenites, nitrates, silicates, nitrites, and chromates, as well as various organic compounds such as mercaptobenzothiazole, tolyltriazole, benzotriazole, piperazine, ethylene diamine tetracetic acid and the reaction product of phosphoric acid or boric acid and an alkanolamine.

Recently, efforts have been made to eliminate the alkali metal nitrates and nitrites from antifreeze compositions as well as amine-corrosion inhibitors such as triethanolamine and diethanolamine. This is because of the possible formation of the carcinogenic nitrosamines which can be formed by the reaction of a second amine and a nitrite. The elimination of nitrates is believed desirable since upon reduction, nitrites are formed which could in turn react with a secondary amine to form the undesirable nitrosamines. The elimination of nitrites and nitrates from antifreeze compositions generally results in greater susceptibility of the metals in contact with such antifreeze compositions to corrode and this is particularly true of iron and steel. Heretofore, antifreeze compositions have been prepared free of alkali metal nitrites and nitrates by incorporating a corrosion inhibitor prepared by the reaction of boric acid, phosphoric acid and a mono-, di- or tri-alkanolamine together with an alkali metal mercaptobenzothiazole. Such compositions, however, have not been entirely satisfactory with respect to the inhibition of corrosion of cast iron and steel in contact with ethylene glycol-based antifreeze compositions as indicated in U.S. Pat. No. 3,350,316. Triethanolamine salts of mono- and dinonylphenol (ethoxylate) phosphate acid esters are also known from U.S. Pat. No. 3,422,166 as corrosion inhibitors for use in metal working operations such as the working of aluminum, iron and steel.

Triethylene diamine, or 1,4-diazaobicyclo-(2.2.2)-octane, is known for use as a catalyst in the preparation of urethanes as disclosed in U.S. Pat. No. 2,939,851. Representative of the prior art use of organic amines as components of corrosion inhibiting compositions for use in protecting metals from corrosion where said metals in contact with aqueous solutions are U.S. Pat. No. 4,130,524 wherein a salt of phosphoric acid and an organic amine, which can be a tertiary monoamine, is disclosed as a corrosion inhibitor useful in the protection of a metallic surface against corrosion. The use of guinuclidine as an inhibitor of iron corrosion under aqueous acid conditions is disclosed by Aramaki in *Denki Kagaku* 1972, 40(8), pages 556–571. Amine/phosphate compositions useful as corrosion inhibitors are also disclosed in U.S. Pat. No. 3,787,319. These are the reaction products of a phosphate ester and a secondary alkyl alkylene diamine. A three-component corrosion inhibitor system is disclosed in U.S. Pat. No. 3,935,125 which is a mixture of a lower alkyl amine pyrophosphate, an organo phosphonate, and a triazole.

SUMMARY OF THE INVENTION

Tertiary, cyclic, bridgehead amines are disclosed for use as corrosion inhibitors under basic or alkaline conditions to inhibit the corrosion of metals below sodium in the electromotive displacement series and especially the corrosion of iron, steel and aluminum. It has been unexpectedly found that not only are said amines useful alone as corrosion inhibitors for metals but the use of said amines in combination with conventional corrosion inhibitors provides unexpectedly improved corrosion resistance when said compositions are used as components of an aqueous alkaline solution with which said metals are in contact. The corrosion inhibitors are especially useful in protecting metals against corrosion by aqueous antifreeze compositions containing an alcohol. The corrosion inhibitors of the invention are effective under alkaline conditions to inhibit the corrosion of all the metals and alloy components commonly found in present day internal combustion engines in contact with the coolant system of said engines.

There is provided a novel corrosion inhibited aqueous alkaline liquid, a novel process for inhibiting corrosion in aqueous alkaline liquids, a novel antifreeze concentrate, and a novel additive composition useful in imparting corrosion resistance to an aqueous alkaline liquid, particularly, an aqueous antifreeze composition.

DETAILED DESCRIPTION OF THE INVENTION AND THE PREFERRED EMBODIMENTS

The antifreeze concentrate compositions of the invention comprise a major proportion of at least one watersoluble alcohol preferably selected from the group consisting of methanol, ethanol, propanol, ethylene glycol, diethylene glycol, triethylene glycol, propylene glycol, methoxypropanol, and glycerol and the inhibitor combination described in greater detail hereinafter. Ethylene glycol is typically the alcohol and especially the commercially available mixtures containing a major portion of ethylene glycol and a minor amount of diethylene glycol. The commercial mixture of ethylene glycol generally contains at least 85 to 97 percent by weight of ethylene glycol with the remainder being diethylene glycol.

Generally, about 85 percent by weight to about 97 percent by weight of the total weight of the antifreeze concentrate of the invention is ethylene glycol and up to about 10 percent by weight of the total weight of said concentrate is diethylene glycol. Preferably, said antifreeze concentrate contains about 90 percent to about 95 percent by weight ethylene glycol and 2 percent to about 7 percent by weight diethylene glycol all based upon the total weight of the antifreeze concentrate. The remainder of the composition comprises a corrosion inhibitor, water, an antifoam agent, and optionally, a water pump lubricant. The tertiary, cyclic, bridgehead amine corrosion inhibitor of the invention is generally present in the proportion of about 0.01 percent to about 5 percent by weight based upon the total weight of said antifreeze concentrate.

The inhibitor component of the invention comprises at least one tertiary, cyclic, bridgehead amine or a combination of said amine with at least one conventional corrosion inhibitor. Said amines can be bi- or tricyclic. The unsubstituted bridgehead diazabicyclic amines (diamines) which are disclosed are represented by the general formula:

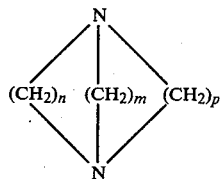
(I)

wherein n equals 1 to 3, m equals 1 to 2, and p equals 1 to 2. Representative of compounds within formula I are 1,3-diazobicyclo[1.1.1]pentane, 1,4-diazabicyclo[2.1.1]hexane, 1,4-diazabicyclo[2.2.1]heptane, 1,5-diazabicyclo[3.1.1]heptane, 1,4-diazabicyclo[2.2.2]octane, 1,5-diazabicyclo[3.2.1]octane, and 1,5-diazabicyclo[3.2.2]nonane.

Substituted diazabicyclic amines have the general formula:

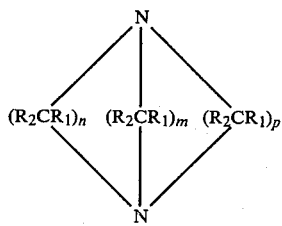
(II)

wherein n, m, and p are as above defined and each of $R_1$ and $R_2$ are independently selected from the group consisting of hydrogen and (a) a monovalent straight or branched chain alkyl or alkylene group having 1 to 6 carbons; and which can contain one or more of the following functional groups: —OH, —CO$_2$H (or the alkali metal salt), —CO$_2$R, halogen, —NH$_2$, —SO$_3$H (or the alkali metal salt), —PO$_3$H$_2$ (or the alkali metal salt), —CN, or —OR (where R is a monovalent alkyl or alkylene as defined above) or alkylene oxide derived groups;

hydrogen and (b) a monovalent monocyclic aromatic hydrocarbon group which can contain one or more ring substituents selected from the following: —H, —R (where R is a monovalent alkyl or alkylene as defined in (a) above), —OH —NH$_2$, —CO$_2$H (or the alkali metal salt), —OR (where R is defined above), —NO$_2$, —SO$_3$H (or the alkali metal salt), or halogen;

hydrogen and (c) a monovalent monocyclic alkyl or alkylene hydrocarbon group of from 3 to 6 carbons which can contain one or more ring substituents selected from the following: monovalent alkyl or alkylene hydrocarbon groups, —OH, —OR (R as defined previously), CO$_2$H (or the alkali metal salt), —NH$_2$, —SO$_3$H (or the alkali metal salt, —PO$_3$H$_2$ (or the alkali metal salts), halogen, or alkylene oxide derived units and provided only one of $R_1$ and $R_2$ can be hydrogen.

Representative of compounds within formula II are 2-methyl-1,4-diazabicyclo[2.2.2]octane, 2-ethyl-1,4-diazabicyclo[2.2.2]octane, 2,5-dimethyl-1,4-diazabicyclo[2.2.2]-octane, 2,6-dimethyl-1,4-diazabicyclo[2.2.2]octane, 2-ethyl-6-methyl-1,4-diazabicyclo[2.2.2]octane, 2-ethyl-5-methyl-1,4-diazabicyclo[2.2.2]octane, 2,3-dimethyl-1,4-diazabicyclo[2.2.2]octane, 2,5,7-trimethyl-1,4-diazabicyclo[2.2.2]octane, 2,2,5,5-tetramethyl-1,4-diazabicyclo[2.2.2]octane, 2,2,3,3-5,5,6,6,7,7,8,8,-dodecafluoro-1,4-diazabicyclo[2.2.2]octane, 8-ethyl-1,5-diazabicyclo[3.2.1]octane, 8-phenyl-1,5-diazabicyclo[3.2.1]octane, 8-methyl-1,5-diazabicyclo[3.2.1]octane, 8-propyl-1,5-diazabicyclo[3.2.1]octane, 8-(2-furyl)-1,5-diazabicyclo[3.2.1]octane, 8-(1-ethylpentyl)-1,5-diazabicyclo[3.2.1]octane, 8-(p-chlorophenyl)-1,5-diazabicyclo[3.2.1]octane, 8-(3,4-dimethoxyphenyl)-1,5-diazabicyclo[3.2.1]octane, 8-[p-(dimethylamino)phenyl]-1,5-diazabicyclo[3.2.1]octane, 8-(p-fluorophenyl)-1,5-diazabicyclo[3.2.1]octane, and 8-(4-pyridyl)-1,5-diazabicyclo[3.2.1]octane.

The bridgehead monoazbicyclic amines disclosed have the general formula:

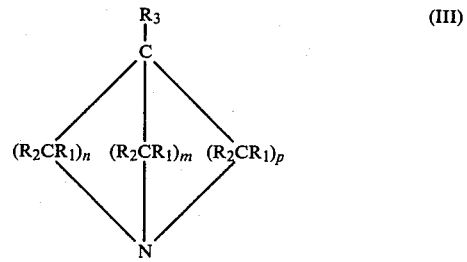
(III)

The monoazabicyclic compounds which are preferred are in practice restricted by consideration of the following: (1) ease of synthesis, (2) known existance, (3) availability and (4) potential cost factors. Thus, the compounds of this type that are preferred can be defined by establishing the bicyclic ring parameters wherein n equals 1 to 3, m equals 1 to 2, and p equals 1 to 2. $R_1$, $R_2$, and $R_3$ are each independently selected from the group consisting of hydrogen and the above defined $R_1$ and $R_2$ groups provided no more than two of the groups $R_1$, $R_2$ and $R_3$ can be hydrogen. Representative of compounds within formula III are: 1-azabicyclo[1.1.1]pentane, 1-azabicyclo[2.1.1]hexane, 1-azabicyclo[2.2.1]heptane, 1-azabicyclo[2.2.2]octane, 1-azabicyclo[3.1.1]heptane, 1-azabicyclo[3.2.1]octane, and 1-azabicyclo[3.2.2]nonane, 2-methyl-1-azabicyclo[2.2.2]octane, 3-ethyl-1-azabicyclo[2.2.2]octane, 2-ethyl-1-azabicyclo[2.2.2]octane, 7-methyl-1-azabicyclo[2.2.2-octane, 3-amino-1-azabicyclo[2.2.2]-octane, 3-cyano-1-azabicyclo[2.2.-

2]octane, 3-phenyl-1-azabicyclo[2.2.2]octane, 3-carboxy-1-azabicyclo[2.2.2]octane, 3-carbomethoxy-1-azabicyclo[2.2.2]octane, 3-acetyl-1-azabicyclo[2.2.2]octane, 3-carbamyl-1-azabicyclo[2.2.2]octane, 3-ethynyl-1-azabicyclo[2.2.2]octane, 3-isobutyryl-1-azabicyclo[2.2.2]octane, 2-isopropyl-2-carbomethoxy-1-azabicyclo[2.2.2]octane, 2-isopropyl-3-carboxy-1-azabicyclo[2.2.2]octane, 3-bromo-1-azabicyclo[2.2.2]octane, 3-chloro-1-azabicyclo[2.2.2]octane, 3-hydroxy-1-azabicyclo[2.2.2]octane, 3-[(p-dimethylamino)phenyl]-1-azabicyclo[2.2.2]octane, 3-(p-methoxyphenyl)-1-azabicyclo[2.2.2]octane, 3-(p-hydroxyphenyl)-1-azabicyclo[2.2.2]octane, 3,3-bis(3,4-dimethoxyphenyl)-1-azabicyclo[2.2.2]octane, 3,3-bis(4-methoxyphenyl)-1-azabicyclo[2.2.2]octane, 4-(N,N-dimethylamino)-1-azabicyclo[2.2.2]octane, 2-benzylidene-5-vinyl-1-azabicyclo[2.2.2]octane, 3-hydroxy-3-cyano-1-azabicyclo[2.2.2]octane, 3-hydroxy-3-carboxy-1-azabicyclo[2.2.2]octane, 2,6-dimethyl-1-azabicyclo[2.2.2]octane, and 7-methyl-1-azabicyclo[2.2.1]heptane.

The bridgehead tetrazatricyclic amines disclosed are represented by the general formula:

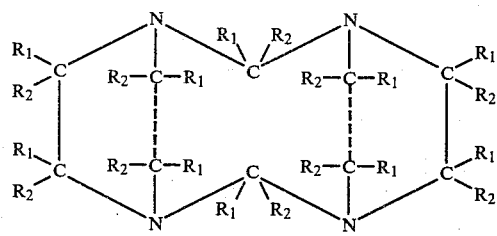

wherein $R_1$ and $R_2$ are as defined above. Where $R_1$ equals $R_2$ equals hydrogen, the IUPAC name for this compound is: 1,4,6,9-tetraazatricyclo[6.2.2.2.$^{6,9}$) tetradecane.

Conventional corrosion inhibitors and/or alkaline pH buffers which can be used under aqueous alkaline conditions in combination with said cyclic, tertiary, bridgehead amine include water-soluble metal salts such as the alkali metal carbonates, borax, the alkali metal dichromates, alkali metal silicates, the alkali metal phosphates, alkali metal tungstates, alkali metal salts of benzoic or toluic acid, the alkali metal salts of phenol, benzotriazole, or tolyltriazole, lower alkanolamines ($C_2$ to $C_6$), i.e., triethanolamine, alkali metal nitrates, alkali metal nitrites, alkali metal mercaptobenzothiazoles, and organosilicone compounds.

Such conventional corrosion inhibitors are utilized under alkaline conditions in an amount effective to inhibit corrosion. Generally, conventional corrosion inhibitors are used in the amount of about 0.03 parts to about 5 parts by weight, preferably about 0.1 to about 2.0 parts by weight, per 100 parts total weight of the antifreeze concentrate. Of the conventional corrosion inhibitors, the water-soluble, metal salt triazoles including benzotriazole and tolyltriazole are particularly desirable for use in the antifreeze compositions of the invention. These compositions are known to inhibit the corrosion of metal where these compounds are added to cooling water which contact said metals as disclosed in U.S. Pat. No. 3,887,481.

The cyclic, tertiary, bridgehead amine is used in a corrosion inhibiting amount, generally about 0.01 part by weight to about 5 parts by weight per 100 parts total weight of the antifreeze concentrate. Preferably, about 0.05 part to about 3 parts by weight, and most preferably about 0.1 part to about 2 parts by weight, all based on the 100 parts total weight of the antifreeze concentrate in which the bicyclic, tertiary, bridgehead amine is present. The proportions of said amine useful in aqueous liquids not subject to dilution with water, as is the antifreeze concentrate of the invention, are about 0.005 part to about 3 parts by weight, preferably about 0.01 part to about 1 part by weight based on 100 parts total weight of said aqueous liquid.

The novel anticorrosive additive composition of the invention comprises about 0.3 parts to about 50 parts, preferably about 1 to about 25 parts by weight of a conventional corrosion inhibitor and/or alkaline pH buffer selected from the conventional corrosion inhibitors and/or alkaline pH buffers recited above, about 0.3 part to about 25 parts, preferably about 1 to about 20 parts by weight of the bicyclic, tertiary, bridgehead amine compound defined above. The composition can contain additionally about 5 parts to about 150 parts, preferably about 20 to about 50 parts by weight of water or an alcohol, as defined above.

The antifreeze concentrate compositions of the invention can be prepared by mixing or dissolving the corrosion inhibitors in the alcohol compounds utilized in the concentrations set out above. The method of formulating the antifreeze composition does not differ from that of the prior art with the exception of providing the novel inhibitor mixture disclosed herein. In addition to the above ingredients, the antifreeze compositions of the invention can contain other additives of the prior art such as antifoam agents, water pump lubricants, acid-base indicators, dyes and the like. Such additives can be employed in the amounts described in the prior art and are generally employed in amounts of less than 5 percent by weight based upon the weight of the antifreeze concentrate.

The pH of the aqueous liquid compositions of the invention is alkaline and generally adjusted to a pH of above 7 to about 12, preferably about 8 to about 11, and most preferably about 8 to about 9. Where water-soluble silicates, i.e., the alkali metal silicates, are used, the preferred pH is about 10 to about 10.8. The pH is maintained within the above pH ranges by the addition of conventional buffers which are generally salts of strong bases and weak acids. These buffer salts are well-known in the art as indicated in U.S. Pat. No. 3,121,692, incorporated herein by reference. The anticorrosive additives of the invention are intended for use under aqueous alkaline conditions at the above pH ranges. The antifreeze concentrates of the invention contain pH buffers which are effective (upon dilution of said concentrate) with water in maintaining the pH of the solution within the above ranges.

Useful antifoam agents are the alkoxylated nonionic surfactants which exhibit low-foaming characteristics. Examples of alkoxylated nonionic synthetic detergents which can be advantageously employed as antifoam agents in the antifreeze compositions of the invention include polyoxyalkylene adducts of hydrophobic bases, as illustrated by PLURONIC® L-61. Typical hydrophobic bases which can be condensed with alkylene oxides are the mono- and polyalkyl phenols and the compounds prepared by condensing polyoxypropylene with a hydrophobic base initiator having from about 1 to 6 carbon atoms and at least one reactive hydrogen atom. Additional useful defoamers based upon nonionic surfactants are disclosed in U.S. Pat. No. 3,931,029, incorporated herein by reference. Useful water pump lubricants are known in the prior art.

The antifreeze concentrate can be diluted with water in accordance with the prior art practice to produce an antifreeze fluid or coolant composition having a desired freezing point. Generally, the antifreeze concentrate of the invention is diluted with about 1 to about 9, preferably about 1 to about 3, volumes of water to arrive at the coolant composition which is circulated in the cooling system of an internal combustion engine.

In the evaluation of the antifreeze formulations of the invention, two test methods were utilized. One test is a short-term electrochemical test, herein referred to as the galvanic corrosion test method. This test is designed to evaluate the aluminum hot surface corrosion phenomena in which the stabilized galvanic corrosion current density of the aluminum hot surface corrosion specimen is measured while under the inhibitive influence of the various antifreeze formulations. This test is run utilizing a 25 percent antifreeze concentrate concentration in ASTM corrosive water (ASTM D-1384). The test solution is maintained at a temperature of 195°±5° F. and the aluminum hot surface specimen is maintained at a temperature of 235°±5° F. The duration of the test is usually three to five days. It has been found that the corrosion current densities obtained in this test are directly proportional to the rate of corrosion. This conclusion is based upon extensive testing of aqueous antifreeze solutions in this test and in similar tests reported by M. S. Walker in the article *The Galvanic Corrosion Behavior of Dissimilar Metal Couples Used in Automotive Applications*, published in the April 1979 issue of *Materials Performance*.

A second test method utilized to evaluate the corrosion tendencies of the antifreeze formulations of the invention is the British Standards Institute, BS 5117: December 1974, "Methods of Test for Corrosion Inhibition Performance of Antifreeze Solutions". This test method was modified to provide pyrex flasks for the cast iron test solution resevoirs specified in the test method. In addition, the use of stainless steel tubing was substituted for the rubber or plastic tubing specified and a positive displacement pump was substituted for the centrifugal pump of the test method. This test is designed to simulate as many as possible of the normal service conditions to which an antifreeze is subjected. Generally, the antifreeze under test is heated by a pair of electric cartridge heaters contained in metal sheaths which are, in turn, immersed in the antifreeze under test. These cartridge heaters are so arranged that during operation, one of them runs continuously while the other operates intermittently under thermostatic control to maintain a steady solution temperature. The metal sheaths in the test utilized in the evaluation of the antifreeze compositions of the invention are made of cast aluminum. These sheaths are capable of disassembly from the cartridge heater and are weighed before and after testing so as to allow the determination of the corrosion by loss or gain in weight of the sheaths. In this test method, the conditions under which an antifreeze composition is subjected to when utilized as a coolant in an internal combustion engine, is simulated by the heated aluminum sheath which corresponds to the aluminum cylinder head of the internal combustion engine. The radiator surface associated with an internal combustion engine is simulated in this test method by a water-cooled copper surface which is immersed in the antifreeze. The loss in weight or corrosion deposits which form on the aluminum sheath are determined quantitatively while the extent of the corrosion deposits, which form on the water-cooled copper surface, are evaluated qualitatively. The duration of the test is about 6 weeks. Further details of this test method can be found in British Standards Institute, BS 5117: December 1974, incorporated herein by reference.

Many antifreeze compositions can be formulated in accordance with the teaching of the present invention. The compositions described below are merely representative of antifreeze compositions contemplated by the invention. Where not otherwise specified throughout this specification and claims, temperatures are given in degrees centigrade and parts, percentages, and proportions are by weight.

EXAMPLES 1-7

Antifreeze concentrates are prepared by blending together the ingredients listed in Table I.

TABLE I

| Antifreeze Concentrates (Parts by Weight) | | | |
|---|---|---|---|
| Ingredients | Example 1 (control) | Example 2 (control) | Example 3 |
| Ethylene Glycol | 88.8 | 90.86 | 90. |
| Diethylene Glycol | 4.9 | 4.78 | 5. |
| Sodium Tolyltriazole (50% aqueous) | | | 0.2 |
| Sodium Mercaptobenzothiazole (50% aqueous) | 1.2 | 0.55 | |
| Phosphoric Acid (85% aqueous) | | | 1.0 |
| $K_2HPO_4$ | 2.56 | | |
| $Na_2HPO_4$ | | | |
| $Na_2B_4O_7 \cdot 5H_2O$ | 0.13 | 1.0 | |
| $Na_2SiO_3 \cdot 5H_2O$ | | 0.15 | |
| $NaNO_2$ | | | |
| $NaNO_3$ | | 0.2 | |
| KOH | 0.2 | | |
| NaOH | | 0.2 | |
| 2-Hepyl-1-(ethoxypropionic acid)-imidazoline Sodium Salt (50% aqueous) | | | 0.2 |
| PLURONIC ® L-61 Polyol | 0.03 | 0.05 | 0.03 |
| 1,4-diazabicyclo-(2.2.2)-octane | | | 3.1 |
| Water | 1.98 | 1.75 | 0.57 |

| Ingredients | Example 4 | Example 5 | Example 6 | Example 7 |
|---|---|---|---|---|
| Ethylene Glycol | 89.30 | 89.30 | 90.25 | 89.30 |
| Diethylene Glycol | 4.7 | 4.7 | 4.75 | 4.7 |
| Sodium Tolyltriazole (50% aqueous) | 0.2 | 0.2 | 0.2 | 0.2 |
| Phosphoric Acid (85% aqueous) | | 1.0 | | |
| $Na_2HPO_4$ | 1.0 | | 1.0 | 1.0 |
| $NaNO_2$ | 0.2 | | 0.2 | 0.2 |
| $NaNO_3$ | 0.2 | | 0.2 | 0.2 |
| 2-Hepyl-1-(ethoxypropionic acid)-imidazoline Sodium Salt (50% aqueous) | | 0.3 | 0.3 | |
| PLURONIC ® L-61 Polyol | 0.03 | 0.03 | 0.03 | 0.03 |
| 1-azobicyclo[2.2.2.]octane | 1.0 | | | |
| 2-methyl-1,4-diazabicyclo[2.2.2]-octane | | 0.3 | | |
| 1,4,6,9-tetraazatricyclo-[6.2.2.2$^{6.9}$]tetradecene | | | 0.02 | |
| 3-hydroxy-1-azabicyclo[2.2.2]octane | | | | 1.0 |
| Water | 3.04 | 1.47 | 3.37 | 3.37 |

The antifreeze compositions of Examples 3 and 5 were evaluated in comparison with prior art antifreeze compositions shown as Examples 1 and 2 in Table I. In the aluminum corrosion test utilizing the modified British Standards Institute test method, it is shown in Table II that a substantial improvement in aluminum corrosion results, as indicated by weight loss comparisons, when Example 3 is utilized as the antifreeze concentrate composition as compared to control Example 2.

With the galvanic corrosion test method, there is shown in Table III that the aluminum corrosion rate, as indicated by current density, is substantially reduced when utilizing the antifreeze compositions of Examples 3 and 5 as compared with the prior art antifreeze composition of Example 1.

TABLE II

Aluminum Corrosion -
Modified British Standards Institute Test Method

| | Corrosion Deposits (mg) | | |
|---|---|---|---|
| | Aluminum Sheath | | |
| Antifreeze Composition | Intermittent Heating | Continous Heating | Copper Surface |
| Example 2 (control) | −1436 | −2145 | Moderate |
| Example 3 | +46 | +100 | None |

− = loss in weight
+ = gain in weight

TABLE III

Aluminum Corrosion - Galvanic Corrosion Test Method

| Antifreeze Composition | Current Density (micro A/cm$^2$) | Corrosion Deposits | Test Period (hours) |
|---|---|---|---|
| Example 1 (control) | 23 | Large | 24 |
| Example 3 | 0.3 | None | 95 |
| Example 5 | 0.1 | None | 95 |

While this invention has been described with reference to certain specific embodiments, it will be recognized by those skilled in the art that many variations are possible without departing from the scope and spirit of the invention and it will be understood that it is intended to cover all changes and modifications to the invention disclosed herein for the purposes of illustration which do not constitute departures from the spirit and scope of the invention.

The embodiments of the invention in which an exclusive privilege or property is claimed are defined as follows:

1. A corrosion inhibited aqueous alkaline alcohol solution for use in contact with metals below sodium in the electromotive displacement series comprising an effective metal corrosion inhibiting amount of at least one tertiary, cyclic, bridgehead amine.

2. The composition of claim 1 wherein said amine is selected from the group consisting of tertiary amines having the general formulas:

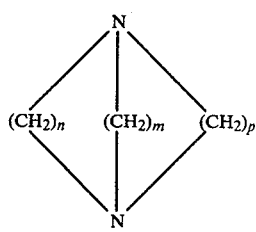

(I)

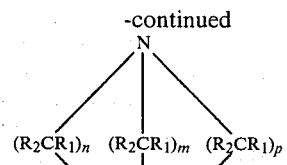

(II)

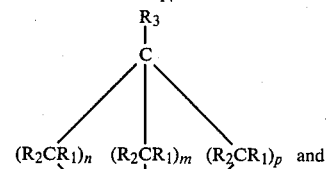

(III)

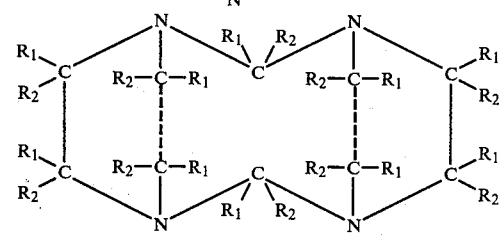

(IV)

wherein n is 1 to 3, m is 1 to 2, and p is 1 to 2; $R_1$, $R_2$ and $R_3$ are each independently selected from the group consisting of:

hydrogen and (a) a monovalent straight or branched chain alkyl or alkylene group having 1 to 6 carbons; and which can contain one or more of the following functional groups: —OH, —CO$_2$H (or the alkali metal salt), —CO$_2$R, halogen, —NH$_2$, —SO$_3$H (or the alkali metal salt), —CN, or —OR (where R is a monovalent alkyl or alkylene as defined above) or alkylene oxide derived groups;

hydrogen and (b) a monovalent monocyclic aromatic hydrocarbon group which can contain one or more ring substituents selected from the following: —H, —R (where R is a monovalent alkyl or alkylene as defined in (a) above), —OH, —NH$_2$, —CO$_2$H (or the alkali metal salt), OR (R as defined above), —NO$_2$, —SO$_3$H (or the alkali metal salt), or halogen;

hydrogen and (c) a monovalent monocyclic alkyl or alkylene hydrocarbon group of from 3 to 6 carbons which can contain one or more ring substituents selected from the following: monovalent alkyl or alkylene hydrocarbon groups, —OH, —OR (R as defined previously), —CO$_2$H (or the alkali metal salt), —NH$_2$, —SO$_3$H (or the alkali metal salt), —PO$_3$H$_2$ (or the alkali metal salt), halogen, or alkylene oxide derived units, and provided only one of $R_1$ and $R_2$ in formula II can be hydrogen and no more than two of $R_1$, $R_2$, and $R_3$ can be hydrogen, and wherein said aqueous alkaline alcohol solution is buffered to a pH of above 7 to about 12.

3. The composition of claims 1 or 2 wherein said aqueous alkaline alcohol additionally contains an effective corrosion inhibiting amount of a conventional metal corrosion inhibitor comprising at least one water-soluble metal salt corrosion inhibitor selected from the group consisting of at least one of the alkali metal carbonates, borax, the alkali metal dichromates, the alkali metal silicates, the water-soluble alkali metal phosphates, the alkali metal tungstates, the alkali metal salts of benzoic or toluic acid, the alkali metal salts of phenol, the alkali metal salts of benzotriazole or tolyltriazole, the water-soluble alkali metal salts of mercaptobenzothiazole, lower alkanolamines, and organosilicones and wherein said aqueous alkaline alcohol is buffered to a pH of about 8 to about 11.

4. The composition of claim 3 wherein said amine is present in an amount of 0.005 part to 3 parts by weight per 100 parts by weight of said aqueous alkaline alcohol solution, and wherein said conventional corrosion inhibitor is present as the alkali metal salt.

5. The composition of claim 4 wherein said alcohol is selected from the group consisting of at least one of methanol, ethanol, propanol, ethylene glycol, diethylene glycol, triethylene glycol, propylene glycol, methoxypropanol, and glycerol.

6. The composition of claim 5 wherein said alcohol comprises ethylene glycol or a mixture of ethylene glycol and diethylene glycol, and said tertiary, cyclic amine is selected from the group consisting of 1,4-diazabicyclo-(2.2.2)-octane, 1-azabicyclo[2.2.2]octane, 2-methyl-1,4-diazabicyclo[2.2.2]-octane, 1,4,6,9-tetraazatricyclo[6.2.2.2.$^{6,9}$]tetradecane, and 3-hydroxy-1-azabicyclo[2.2.2]octane.

7. A process for inhibiting the corrosion of metals below sodium in the electromotive displacement series in contact with an aqueous alkaline alcohol solution, said process comprising adding to said solution an effective metal corrosion inhibiting amount of a corrosion inhibitor comprising the corrosion inhibitor of claims 1 or 2.

8. The process of claim 7 wherein said corrosion inhibitor is present in the amount of about 0.005 part to about 3 parts by weight per 100 parts total weight of said aqueous alkaline alcohol solution.

9. The process of claim 8 wherein said aqueous alkaline alcohol additionally contains an effective corrosion inhibiting amount of a conventional metal corrosion inhibitor comprising a water-soluble metal salt selected from the group consisting of at least one of the alkali metal carbonates, borax, the alkali metal chromates, the metal silicates, the alkali metal phosphates, the alkali metal tungstates, the alkali metal salts of benzoic or toluic acid, the alkali metal salts of phenol, the alkali metal salts of benzotriazole or tolyltriazole, and the alkali metal salts of mercaptobenzothiazole, lower alkanolamines, and organosilicones, and wherein said aqueous alkaline alcohol is buffered to a pH of about 8 to about 11.

10. The process of claim 9 wherein said alcohol comprises ethylene glycol or a mixture of ethylene glycol and diethylene glycol, said conventional corrosion inhibitor is an alkali metal salt, said amine is 1,4-diazabicyclo-(2.2.2)-octane, and said aqueous alkaline alcohol solution is buffered to a pH of about 8 to about 9.

11. The process of claim 10 wherein said conventional corrosion inhibitor is selected from the group consisting of at least one of an alkali metal phosphate, an alkali metal nitrite and an alkali metal nitrate.

12. The process of claim 11 wherein said aqueous alkaline alcohol solution additionally contains an alkali metal salt of tolyltriazole.

13. A corrosion inhibited alcohol-based antifreeze concentrate composition for use upon dilution with water in the cooling system of an internal combustion engine comprising in admixture at least one alcohol selected from the group consisting of methanol, ethanol, propanol, ethylene glycol, diethylene glycol, triethylene glycol, propylene glycol, methoxypropanol, and glycerol and, as a corrosion inhibitor, an effective metal corrosion inhibiting amount of the amine of claims 1 or 2 and wherein said concentrate contains a buffer capable of buffering the concentrate upon dilution with water at a pH of about 8 to about 11.

14. The composition of claim 13 additionally containing an effective corrosion inhibiting amount of at least one water-soluble metal salt conventional metal corrosion inhibitor wherein said conventional corrosion inhibitor is selected from the group consisting of at least one of the alkali metal carbonates, borax, the alkali metal dichromates, the alkali metal silicates, the alkali metal phosphates, the alkali metal tungstates, the alkali metal salts of benzoic or toluic acid, the alkali metal salts of phenol, the alkali metal nitrates, the alkali metal nitrites, the alkali metal mercaptobenzothiazoles, benzotriazoles, and tolyltriazoles, and the alkali metal salts of lower alkanolamines and organosilicones.

15. The composition of claim 14 wherein said amine is 1,4-diazabicyclo-(2.2.2)-octane, and wherein said alcohol comprises ethylene glycol or a mixture of ethylene glycol and diethylene glycol.

16. The composition of claim 15 wherein said composition additionally contains the sodium salt of tolyltriazole, said amine is present in the proportion of about 0.01 part to about 5 parts by weight per 100 parts total weight of said concentrate, and said conventional corrosion inhibitor is selected from the group consisting of at least one of an alkali metal phosphate, an alkali metal nitrate, and an alkali metal nitrite.

* * * * *